(12) United States Patent
Andriessen et al.

(10) Patent No.: US 6,306,747 B1
(45) Date of Patent: *Oct. 23, 2001

(54) CONDUCTIVE METAL OXIDE BASED LAYER

(75) Inventors: Hieronymus Andriessen, Beerse; Steven Lezy, Antwerpen, both of (BE)

(73) Assignee: Agfa-Gevaert, Mortsel (BE)

( * ) Notice: Subject to any disclaimer, the term of this patent is extended or adjusted under 35 U.S.C. 154(b) by 0 days.

This patent is subject to a terminal disclaimer.

(21) Appl. No.: 09/497,758

(22) Filed: Feb. 4, 2000

(30) Foreign Application Priority Data

Feb. 26, 1999 (EP) .................................................. 99200554

(51) Int. Cl.⁷ .................................................. H01L 21/44
(52) U.S. Cl. ........................ 438/609; 438/608; 427/126.3
(58) Field of Search .................................. 438/609, 608; 430/270.1; 427/126.3

(56) References Cited

U.S. PATENT DOCUMENTS

| | | |
|---|---|---|
| 4,524,051 | 6/1985 | Wright et al. . |
| 4,888,210 * | 12/1989 | Isozaki et al. ..................... 427/126.3 |
| 5,368,995 * | 11/1994 | Christian et al. ..................... 430/530 |
| 5,707,745 | 1/1998 | Forrest et al. . |
| 5,721,160 | 2/1998 | Forrest et al. . |
| 5,757,026 | 5/1998 | Forrest et al. . |
| 6,030,700 | 2/2000 | Forrest et al. . |
| 6,132,927 * | 10/2000 | Daems et al. ..................... 430/270.1 |

FOREIGN PATENT DOCUMENTS

| | | |
|---|---|---|
| 0 290 345 | 11/1988 | (EP) . |
| 64-081112 | 3/1989 | (JP) . |
| 05-017878 | 1/1993 | (JP) . |
| 05-218476 | 8/1993 | (JP) . |
| 05-218477 | 8/1993 | (JP) . |
| 08-031572 | 2/1996 | (JP) . |
| 08-281857 | 10/1996 | (JP) . |
| 09-024574 | 1/1997 | (JP) . |

OTHER PUBLICATIONS

K. L. Chopra, S. Major and D. K. Pandya; Transparent Conductors—A Status Review; Thin Solid Films, Vol. 102 (1983); pp. 1–46; Elsevier Sequoia, The Netherlands.

Hideo Watanabe; Preparation of $SnO_2$ Films by Oxydizing Evaporated Sn Films; Japan. J. Appl. Phys. 9 (1970); Short Notes pp. 1551–1552.

Taneo Nishino and Yoshihiro Hamakawa; Electrical and Optical Properties of $Si-SnO_2$ Heterojunctions; Japanese Journal of Applied Physics, vol. 9, No. 9, Sep. 1970, pp. 1085–1090.

Ghorg Rupprecht; Untersuchungen der elektrischen und lichtelektrischen Leitfähigkeit dünner Indiumoxyd–schichten; Zeitschrift für Physik, Bd. 139, S. 504–517 (1954).

Hideo Watanabe; The Influence of Ambient Oxygen on the Electronic Conductivity of ZnO Thin Films; Japan. J. Appl, Phys. 9. (1970); Short Notes pp. 418–421.

Patent Abstracts of Japan, vol. 018, No. 113 (E–1514), Feb. 23, 1994 and JP 05 314820 A (Matsushita Electric Ind. Co. Ltd.), Nov. 26, 1993.

Patent Abstracts of Japan, vol. 095, No. 002, Mar. 31, 1995 and JP 06 316439 A (Sumitomo Cement Co. Ltd.), Nov. 15, 1994.

* cited by examiner

*Primary Examiner*—Amir Zarabian
*Assistant Examiner*—Christian D. Wilson
(74) *Attorney, Agent, or Firm*—Breiner & Breiner, L.L.C.

(57) ABSTRACT

A conductive metal oxide based layer on a substrate is prepared by chemically reducing a metal salt in aqueous solution, coating the resulting aqueous metal dispersion after washing onto a substrate, preferably glass, and subjecting the coated layer to an oxidizing treatment, e.g. a heat step. In a preferred embodiment the metal oxide is tin oxide, or a mixture of tin oxide and another metal oxide.

12 Claims, No Drawings

CONDUCTIVE METAL OXIDE BASED LAYER

FIELD OF THE INVENTION

The present invention relates to the field of conductive layers based on metal oxides.

BACKGROUND OF THE INVENTION

Conductive layers deposited on a flexible transparent substrate have found major applications in various electronic and opto-electronic devices. A particular useful type of transparent conductive layer is based on metal oxides. These metal oxides can be applied to a substrate by different rather cumbersome methods. A review is given in K. L. Chopra et al, "Transparent Conductors—A Status Review", *Thin Solid Films*, 102, (1983), p. 1–46.

The most important metal oxides used in conductive layers are non-stoichiometric and doped oxides of tin, indium, cadmium, zinc and their various alloys. Well known examples of the latter category include tin oxide (TO) doped with antimony (ATO) or fluorine (FTO), indium oxide (IO) doped with tin (ITO), and zinc oxide doped with indium (IZO). These metal oxides exhibit high transmittance in the visible spectral region, high reflectance in the IR region and nearly metallic conductivity. The electrical as well as the optical properties of these materials can be tailored by controlling the deposition parameters.

Applications of these transparent conductive layers on flexible substrates can be divided in:

highly conductive layers (<0.5 kΩ/sq) with applications in displays (electroluminescent displays, Liquid Crystal Devices, Plasma Display Panels), touchscreens, solar cells and smart windows;

conductive layers (>0.5 kΩ/sq) with applications in EMI-shielding foils, electroluminiscent lamps and membrane switches.

Other applications include heating elements for aircraft and automobile windows, heat-reflecting mirrors, antireflection coatings and gas sensors.

Examples of references dealing with the various applications of conductive layers based on metal oxides include:

in solar cells the use of TO layers is disclosed in JP-A 05-'218477, JP-A 05-218476, EP 290345, the use of FTO layers in JP-A 05-017878;

for electroluminiscent displays the use of various metal oxide layers is disclosed in e.g. JP-A 09-024574, JP-A 08-281857, FR 2728082, JP-A 08-031572, and JP-A 01-081112;

A first main category of deposition techniques to form metal oxide layers on a substrate is evaporation. This technique can be further subdivided in post-oxidation of metal films, reactive evaporation, activated reactive evaporation, and direct evaporation. A second main category is sputtering, which can be further subdivided in reactive sputtering of metallic targets, direct sputtering of oxide targets and ion beam sputtering. Still further types of deposition techniques include reactive ion plating, chemical vapour deposition, spray pyrolysis, dip technique, chemical solution growth, reactive triode sputtering, and glow discharge composition.

In the scientific literature (M. Watanabe, *Jpn. J. Appl. Phys.*, 9(1970) 1551; T. Nishino and Y. Hamakawa, *Jpn. J. Appl. Phys.*, 9(1970) 1085; G. Bauer, *Ann. Phys.* (Paris), 30(1937) 433; G. Rupprecht, *Z. Phys.*, 139(1954) 504; M. Watanabe, *Jpn. J. Phys.*, 9(1970) 418) it is disclosed that a very thin (max. 50 nm) Sn layer (or In or Zn) deposited by evaporation can be oxidized whereby a transparent electrically conductive layer is formed. A serious drawback of this method is that with thicker layers the oxidation cannot be performed completely. Probably, due to the continuous phase nature of the metal film the passage of oxygen through this film is insufficient.

OBJECTS OF THE INVENTION

It is an object of the present invention to provide a process for the preparation of a conductive metal oxide layer on a substrate which is less cumbersome and more economic than the existing methods described above.

It is a further object of the invention to provide a process which allows for the formation of thicker metal oxide layers than is possibel with the prior art methods.

SUMMARY OF THE INVENTION

The objects of the present invention are realized by providing a process for the preparation of a conductive metal oxide based layer on a substrate comprising the following steps, in order :

(a) preparing an aqueous medium containing at least one type of metal salt, (b) chemically reducing said metal salt by a reducing agent to form a dispersion of metal particles, (c) washing said dispersion of metal particles, (d) coating said washed dispersion onto a substrate, thereby obtaining a coated layer containing metal particles, (e) subjecting said coated layer to an oxidizing treatment to form a conductive layer containing metal oxide particles.

In a most preferred embodiment the metal oxide is tin oxide or a mixture of the oxides of tin and another metal. The oxidizing treament is preferably a heat treament in an oxygen containing atmosphere.

Further advantages and embodiments of the present invention will become apparent from the following description.

DETAILED DESCRIPTION OF THE INVENTION

The process for preparing a conductive metal oxide layer on the transparent support will now be explained on the hand of the preferred embodiment wherein the metal oxide is tin oxide.

In a first step (a) an aqueous solution of a tin(IV) salt is prepared. As most suitable tin salt tin(IV) chloride is chosen. In order to maintain a sufficient amount of tin ions in solution, it is desirable to add a complexing agent. A preferred complexant is the well-known ethylenediaminetetraacetic acid (EDTA) or a homologous compound or a salt thereof. Another preferred one is citrate, e.g. triammonium citrate. Other suitable complexants include diethylenetriamine-pentaacetic acid (DTPA), trans-1,2-diaminocyclohexane-N, N,N',N'-tetraacetic acid (CDTA), ethyleneglycol-O,O'-bis(2-aminoethyl)-N,N,N',N'-tetraacetic acid (EGTA), N-(2-hydroxyethyl)ethylenediamine-N,N,N'-triacetic acid (HEDTA), etc.

In a following step the tin ions in the solution are reduced to highly dispersed metallic tin particles by means of the addition of a reducing agent. A preferred reducing agent is $KHB_4$. Another suitable reducing agent is sodium hyposulphite. Others include glucose, formaldehyde and hypophosphorous acid. The reducing agent can be added to the original tin salt solution as a solid powder. On the other hand the reducing agent can be dissolved separately in a second aqueous medium and added to the tin salt solution according to a single jet or a double jet procedure. Preferably, according to the double jet principle, the aqueous medium containing the tin salt and the second solution containing the reducing agent are added together to a third aqueous medium.

In order to keep the metallic tin particles formed by reduction in colloidal dispersion a protective binder is preferably added to any of the three aqueous solutions involved. Preferably, this protective binder is added to the third aqueous medium wherein both others are jetted. A particularly preferred protective binder is carboxymethylcellulose (CMC), preferably of the high viscosity type. Other possible binders include gelatin, arabic gum, poly (acrylic acid), polyvinyl alcohol, cellulose derivatives and other polysaccharides.

When the reduction is substantially completed the superfluous ions present in the aqueous medium are removed from it by a washing process (step c), preferably involving ultrafiltration and/or diafiltration. This washing process may be preceeded ,by ultracentrifugation. In any of the solutions involved in the preparation a so-called dispersing aid can be present. In a preferred embodiment this compound is added to the diafiltration liquid at the last stage of the preparation. Suitable dispersing aids in the case of tin are pyrophosphates, more particularly a hexametaphosphate such as sodium hexametaphosphate. Due to the high affinity of the phosphate to metal oxides the phosphate will absorb immediately to the freshly formed metal oxide surface layer, which will be formed upon removing the excess of reducing agent during the first stage of the washing step. This absorption of phosphates' controls the further oxidation/passivation process resulting in a very thin and stable metal oxide shell. Furthermore, due to the adsorption of the phosphates the tin particles become negatively charged. This causes electrostatic repulsion by which the particles will be kept in dispersion.

In a preferred embodiment the tin particles are ultrafiltrated e.g. through a Fresenius F60 cartridge and subsequently diafiltrated against a solution of sodium hexametaphosphate in water/ethanol (98.5/1.5).

After the addition of one or more coating agents the washed aqueous medium is coated (step d) on a substrate, preferably a transparent substrate, by means of a conventional coating technique, such as slide hopper, curtain coating, spin coating, extrusion and air-knife coating. After coating the layer is dried.

Suitable coating agents include non-ionic agents such as saponins, alkylene oxides e.g. polyethylene glycol, polyethylene glycol/polypropylen glycol condensation products, polyethylene glycol alkyl esters or polyethylene glycol alkylaryl esters, polyethylene glycol esters, polyethylene glycol sorbitan esters, polyalkylene glycol alkylamines or alkylamides, silicone-polyethylene oxide adducts, glycidol derivaties, fatty acid esters of polyhydric alcohols and alkyl esters of saccharides; anionic agenst comprising an acid group such as a carboxy, sulpho, phospho, sulphuric or phosphorous ester group; ampholytic agents such as aminoacids, aminoalkyl sulphonic acids, aminoalkyl sulphates or phosphates, alkyl betaines, and amine-N-oxides; and cationic agents such as aklylamine salts, aliphatic, aromatic, or heterocyclic quaternary ammonium salts, aliphatic or heterocyclic ring-containing phosphonium or sulphonium salts. Other suitable surfactants include perfluorinated compounds.

In a preferred embodiment of the present invention saponine is used as coating aid.

The thickness of the obtained Sn layer is preferably comprised between 0.1and 1.5 $\mu$m.

In a preferred embodiment of the present invention the substrate on which the Sn layer has to be coated is a transparent substrate. Most suited is a glass substrate. Such an assemblage is particularly suitable for incorporation in an electronic or opto-electronic device.

As alternative to glass a transparent polymeric resin can be chosen as substrate for the tin layer. Useful transparent organic resin supports include e.g. cellulose nitrate film, cellulose acetate film, polyvinylacetal film, polyimide film, polystyrene film, polyethylene terephthalate film, polycarbonate film, polyvinylchloride film or poly-$\alpha$-olefin films such as polyethylene or polypropylene film. The thickness of such organic resin film is preferably comprised between 0.05 and 0.35mm. In a most preferred embodiment of the present invention the support is a polyethylene terephthalate layer provided with a subbing layer. This subbing layer can be applied before or after stretching of the polyester film support. The polyester film support is preferably biaxially stretched at an elevated temperature of e.g. 70–120° C., reducing its thickness by about ½ to ⅙ or more and increasing its area 2 to 9 times. The stretching may be accomplished in two stages, transversal and longitudinal in either order or simultaneously. The subbing layer, when present, is preferably applied by aqueous coating between the longitudinal and transversal stretch, in a thickness of 0.1 to 5 mm. The subbing layer preferably contains, as described in European Patent Application EP 0 464 906, a homopolymer or copolymer of a monomer comprising covalently bound chlorine. Examples of said homopolymers or copolymers suitable for use in the subbing layer are e.g. polyvinyl chloride; polyvinylidene chloride; a copolymer of vinylidene chloride, an acrylic ester and itaconic acid; a copolymer of vinyl chloride and vinylidene chloride; a copolymer of vinyl chloride and vinyl acetate; a copolymer of butylacrylate, vinyl acetate and vinyl chloride or vinylidene chloride; a copolymer of vinyl chloride, vinylidene chloride and itaconic acid; a copolymer of vinyl chloride, vinyl acetate and vinyl alcohol etc. Polymers that are water dispersable are preferred since they allow aqueous coating of the subbing layer which is ecologically advantageous.

The formation of the metal layer has been described on the hand of a preferred embodiment wherein the metal is tin. However, the scope of the present invention is not limited to tin, but extends to other metals that can form thin metal layers by a similar procedure, and the oxide of which is conductive. Possible other metals include Al, Ga, In, Ge, Bi, As, and Sb.

Furtheron, mixtures of two or more metal salts can be reduced and coated. In a preferred embodiment the mixture is a combination of a tin salt and another metal salt, e.g. an antimony salt.

It will be readily understood that for each particular metal (or combination of metals) the choice of the metal salt(s), the complexant if any, the binder and dispersing aid, the reducing agent, etc., must be optimized and that the preferred embodiments will in most cases deviate from the preferred embodiments when the metal is tin.

In a final step (e) the metal particles contained in the coated layer are oxidized to a metal oxide or mixture of metal oxides. In a most preferred and simple embodiment the oxidizing treatment is a heat treatment in an oxygen containing atmosphere. This can most simply be accomplished by inserting the substrate plus metal layer in a hot furnace under normal atmospheric conditions. For instance, in the specific case of a glass substrate coated with a layer containing Sn particles the furnace is operated for about six hours at 400 to 600° C. under current atmospheric composition. The oxidation of a coated metal layer goes better than the oxidation of an evaporated metal layer, probably due to the discrete nature of the metal particles contrary to the continuous phase nature of an evaporated metal film. The passage of oxygen trough relative thick layers remains possible and as a result these relative thick layers can be oxidized completely The final obtained conductivity is evaluated by measuring the relative resistivity.

The thus prepared conductive metal oxide layers on a substrate can be advantageously in various types of electronic or opto-electronic devices, such as enumerated above.

The present invention will now be illustrated by the following examples without however being limited thereto.

EXAMPLES

Example 1

Preparation and coating of a tin dispersion

The following solutions were prepared:

| Solution 1 | |
|---|---|
| Water | 292 ml |
| SnCl$_4$.5H$_2$O | 269 g |
| Triammonium citrate (70% in water) | 700 ml |
| Water to | 2330 ml |
| Solution 2 | |
| DW | 1300 ml |
| NH$_3$ (26% in water) | 2 ml |
| KBH$_4$ | 47.1 g |
| Solution 3 | |
| Water | 1136 ml |
| Carboxymethylcellulose (3% in water) | 104 ml |

The tin dispersion was prepared as follows:

To solution 3, held at 40° C. and stirred at 450 rpm, solution 1 at a flow rate of 200 ml/min was simultaneously added with solution 2 at 117 ml/min. After the reduction was completed the tin dispersion was ultrafiltrated through a Fresenius F60 cartridge and diafiltrated with a 0.2% solution of sodium hexametaphosphate in water/ethanol (98.5/1.5) (dispersion 1). The dispersion was stirred and 10 ml of a 12.5% solution of Saponine Quillaya (Schmittmann) in water/ethanol (80/20) was added, The dispersion was analysed for its particle size distribution (weight average d$_{wa}$) with the Disc Centrifuge Photosedimentometer BROOKHAVEN BI-DCP. A d$_{wa}$ of 93 nm ($\sigma_{wa}$=12) was obtained.

This tin dispersion was coated on a glass substrate (FlACHGLAS AG) with a coating knife of 75 μm. This layer had a lateral resistivity of 2.4×10$_{12}$ Ohm/Sq and an optical visual density of over 3.00.

The lateral resistivity was measured with a Keithley pico Ampereo meter following DIN 53482 and the density was measured with an Macbeth optical densitometer.

Preparation of a conductive transparent layer

Subsequently, the coated layer was put in a furnace for 6 hours at 600° C. A lateral resistivity of 2×10$_6$ Ohm/sq and an optical visual density of 0.40 was obtained.

Example 2

Preparation and coating of tin dispersions

The same solutions 2 and 3 as in the previous example were used. The following new solution were prepared:

| Solution 4 | |
|---|---|
| Water | 292 ml |
| SnCl$_4$.5H$_2$O | 269 g |
| Triammonium citrate (70% in water) | 700 ml |
| NH$_3$ (26% in water) | 50 ml |
| Water to | 2330 ml |
| Solution 5 | |
| Water | 292 ml |
| SnCl$_4$.5H$_2$O | 269 g |
| Triammonium citrate (70% in water) | 700 ml |
| NH$_3$ (26% in water) | 100 ml |
| Water to | 2330 ml |
| Solution 6 | |
| Water | 292 ml |
| SnCl$_4$.5H$_2$O | 269 g |
| Triammonium citrate (70% in water) | 700 ml |
| NH$_3$ (26% in water) | 160 ml |
| Water to | 2330 ml |

Three tin dispersions were prepared as follows:

To solution 3, held at 40° C. and stirred at 450 rpm, solution 4 at a flow rate of 200 ml/min was simultaneously added with solution 2 at 117 ml/min (tin dispersion 2).

To solution 3, held at 40° C. and stirred at 450 rpm, solution 5 at a flow rate of 200 ml/min was simultaneously added with solution 2 at 117 ml/min (tin dispersion 3).

To solution 3, held at 40° C. and stirred at 450 rpm, solution 6 at a flow rate of 200 ml/min was simultaneously added with solution 2 at 117 ml/min (tin dispersion 4).

After the reduction was completed the tin dispersions were ultrafiltrated through a Fresenius F60 cartridge and diafiltrated with a 0.2% solution of sodium hexametaphosphate in water/ethanol (98.5/1.5). The dispersions were stirred and 10 ml of a 12.5% solution of Saponine Quillaya (Schmittmann) in water/ethanol (80/20) was added.

The dispersions were analyzed for their particle size distribution (weight average d$_{wa}$) with the Disc centrifuge Photosedimentometer BROOKHAVEN BI-DCP. These tin dispersions were coated by means of a 75 μm coating knife on a glass substrate. The lateral resistivities and visual optical densities are summarized in table 1.

Preparation of the conductive transparent layers

Table 1 summarizes the results obtained after heat treatment of the samples.

TABLE 1

| Sample | Treatment | Lateral resistivity (Ohm/sq) | Visual optical density | $d_{WA}$ (nm) | g Sn/m$^2$ |
|---|---|---|---|---|---|
| tin dispersion 2 | no | $10^{11}$ | 1.21 | 32 ± 17 | 0.63 |
| | 7 h at 400° C. | $10^9$ | 0.09 | | |
| tin dispersion 2 | no | $10^{11}$ | 1.55 | 43 ± 17 | 0.87 |
| | 7 h at 400° C. | $10^7$ | 0.20 | | |
| tin dispersion 2 | no | $10^{11}$ | 1.69 | 47 ± 17 | 0.92 |
| | 7 h at 400° C. | $2 \times 10^5$ | 0.22 | | |

As can be seen from table 1 the surface conductivity after the heat treament depends upon the preparation conditions of the Sn dispersion.

Example 3

In this example the influence of the concentration of the reducing agent is demonstrated.

The following new solutions were prepared.

| Solution 7 | |
|---|---|
| DW | 1300 ml |
| NH$_3$ (26% in water) | 2 ml |
| KBH$_4$ | 19 g |
| Solution 8 | |
| DW | 1300 ml |
| NH$_3$ (26% in water) | 2 ml |
| KBH$_4$ | 70.6 g |

The three tin-dispersions were prepared as follows:

To solution 3, held at 40° C. and stirred at 450 rpm, solution 6 at a flow rate of 200 ml/min was simultaneously added with solution 7 at 117 ml/min (tin dispersion 5).

To solution 3, held at 40° C. and stirred at 450 rpm, solution 6 at a flow rate of 200 ml/min was simultaneously added with solution 2 at 117 ml/min (tin dispersion 6).

To solution 3, held at 40° C. and stirred at 450 rpm, solution 6 at a flow rate of 200 ml/min was simultaneously added with solution 8 at 117ml/min (tin dispersion 7).

After the reduction was completed the tin dispersions were ultrafiltrated through a Fresenius F60 cartridge and diafiltrated 10 with a 0.2% solution of sodium hexametaphosphate in water/ethanol (98.5/1.5). The dispersions were stirred and 10 ml of a 12.5% solution of Saponine Quillaya (Schmittmann) in water/ethanol (80/20) was added.

These tin dispersions were coated by means of a 75 µm coating knife on a glass substrate. The lateral resistivities and visual optical densities are summarized in table 2.

Preparation of the conductive transparent layers

Table 2 summarizes the results obtained after heat treatment of the samples.

TABLE 2

| Sample | Treatment | Lateral resistivity (Ohm/sq) | Visual optical density | $d_{WA}$ (nm) |
|---|---|---|---|---|
| tin dispersion 5 | no | $10^{11}$ | 0.80 | 69 ± 11 |
| | 7 h at 400° C. | $10^7$ | 0.35 | |
| tin dispersion 6 | no | $10^{11}$ | 3.10 | 62 ± 5 |
| | 7 h at 400° C. | $10^6$ | 0.18 | |
| tin dispersion 7 | no | $10^{11}$ | 2.30 | 135 ± 35 |
| | 7 h at 400° C. | $2.5 \times 10^4$ | 0.70 | |

As can be seen from table 2, the surface conductivity after the heat treatment depends upon the preparation conditions of the Sn dispersion.

Example 4

Preparation and coating of a tin/antimony dispersion

The following new solution was prepared:

| Solution 9 | |
|---|---|
| Water | 400 ml |
| KSb(OH)$_6$ | 12.2 g |
| Triammonium citrate (70% in water) | 700 ml |
| SnCl$_4$.5H$_2$O | 269 g |
| NH$_3$ (26% in water) | 160 ml |
| Water to | 2200 ml |

The tin/antimony-dispersion was prepared as follows:

To solution 3, held at 40° C. and stirred at 450 rpm, solution 9 at a flow rate of 200 ml/min was simultaneously added with solution 2 at 117 ml/min. After the reduction was completed the tin/antimony dispersion was ultrafiltrated through a Fresenius F60 cartridge and diafiltrated with a 0.2% solution of sodium hexametaphosphate in water/ethanol (98.5/1.5). The dispersion was stirred and 10 ml of a 12.5% solution of Saponne Quillaya (Schmittmann) in water/ethanol (80/20) was added.

This tin/antimony dispersion (8) was coated on a glass substrate with a coating knife of 75 µm. This layer has a lateral resistivity of $10^{12}$ Ohm/Sq and an optical visual density of over 3.00.

Preparation of the conductive transparent layer

Table 3 summarizes the results obtained after heat treatment of the samples.

TABLE 3

| Sample | Treatment | Lateral resistivity (Ohm/sq) | Visual optical density |
|---|---|---|---|
| tin dispersion 6 (comp) | no | $10^{11}$ | 3.10 |
| | 7 h at 400° C. | $10^6$ | 0.18 |
| tin/antimony dispersion 8 | no | $10^{11}$ | 2.60 |
| | 7 h at 400° C. | $10^5$ | 0.18 |

What is claimed is:

1. A process for the preparation of a conductive metal oxide based layer on a substrate comprising the following steps, in order:

(a) preparing an aqueous medium containing at least one type of metal salt, (b) chemically reducing said metal salt by a reducing agent to form a dispersion of metal particles, (c) washing said dispersion of metal particles, (d) coating said washed dispersion onto a substrate, thereby obtaining a coated layer containing metal particles, (e) subjecting said coated layer to an oxidizing treatment to form a conductive layer containing metal oxide particles.

2. A process according to claim 1 wherein said metal salt is a tin(IV) salt.

3. A process according to claim 1 wherein said at least one metal salt is a mixture of a tin(IV) salt and a Sb(V) salt.

4. A process according to claim 1 wherein said oxidizing treatment (e) is a heat treatment in an oxygen containing atmosphere.

5. A process according to claim 1 wherein the chemical reduction step (b) is performed by adding said aqueous medium (a) containing said at least one type of metal salt simultaneously with a second aqueous solution containing said reducing agent to a third aqueous medium.

6. A process according to claim 1 wherein said reducing agent is $KBH_4$.

7. A process according to claim 1 wherein a protective binder is added in any of steps (a), (b), or (c).

8. A process according to claim 7 wherein said protective binder is carboxymethyl cellulose.

9. A process according to claim 1 wherein said washing step (c') involves ultrafiltration and/or diafiltration.

10. A process according to claim 1 wherein said substrate is a transparent substrate.

11. A process according to claim 10 wherein said tranparent substrate is glass.

12. Electronic or opto-electronic device comprising a conductive metal oxide based layer prepared according to claim 1.

* * * * *

UNITED STATES PATENT AND TRADEMARK OFFICE
CERTIFICATE OF CORRECTION

PATENT NO. : 6,306,747 B1
DATED : October 23, 2001
INVENTOR(S) : Hieronymus Andriessen et al.

It is certified that error appears in the above-identified patent and that said Letters Patent is hereby corrected as shown below:

Title page,
Item [60], insert the following:
-- Related U.S. Application Data
Provisional Appl. No. 60/127,151,
March 31, 1999 --;

Column 6,
Line 3, "$2.4 \times 10_{12}$ Ohm/Sq" should read -- $2.4 \times 10^{12}$ Ohm/Sq --;
Line 12, "$2 \times 10_6$ Ohm/Sq" should read -- $2 \times 10^6$ Ohm/Sq --;

Column 7,
Table 1, line 10, "persion 2" should read -- persion 3 --;
Table 1, line 13, "persion 2" should read -- persion 4 --;
Line 55, after "diafiltrated" delete "10".

Signed and Sealed this

Eighteenth Day of March, 2003

JAMES E. ROGAN
*Director of the United States Patent and Trademark Office*